United States Patent

[11] 3,604,088

| [72] | Inventor | Peter H. Turner<br>Granada Hills, Calif. |
|---|---|---|
| [21] | Appl. No. | 885,458 |
| [22] | Filed | Dec. 16, 1969 |
| [45] | Patented | Sept. 14, 1971 |
| [73] | Assignee | Sargent Industries, Inc.<br>Burbank, Calif. |

[54] METHOD AND APPARATUS FOR MAKING BEARINGS
13 Claims, 7 Drawing Figs.

[52] U.S. Cl. .................................................... 29/149.5 B,
29/200 E, 29/200 R, 29/421
[51] Int. Cl. .................................................... B23p 11/00,
B23p 17/00, B23p 19/00

[50] Field of Search ............................................ 29/149.5 B,
421 M, 149.5, 421, 149.5 NM, 200, 200 E

[56] References Cited
UNITED STATES PATENTS
| 3,303,557 | 2/1967 | Litsky .......................... | 29/149.5 B |
| 3,431,625 | 3/1969 | Schenk et al. ................ | 29/421 M |

*Primary Examiner*—Thomas H. Eager
*Attorney*—Smyth, Roston & Pavitt

ABSTRACT: A method of, and apparatus for, making a bearing of the type which includes a ball-like inner member and a race circumscribing the inner member. The race is deformed into cooperative sliding engagement with the ball utilizing the energy from a magnetic field.

INVENTOR
PETER H. TURNER
BY
Smyth, Roston & Pavitt
ATTORNEYS

INVENTOR
PETER H. TURNER
BY
Smyth, Roston & Pavitt
ATTORNEYS

METHOD AND APPARATUS FOR MAKING BEARINGS

BACKGROUND OF THE INVENTION

The present invention relates to an apparatus for, and a method of, making bearings of the type which includes an inner member and a race. Typically the inner member is a ball-like member having a spherical outer bearing surface, and the race typically circumscribes the ball-like member and has a spherical inner bearing surface which conforms to the outer bearing surface. The bearing surfaces are slidable to permit relative pivotal movement between the ball-like member and the race.

In making this kind of bearing, the race is initially generally cylindrical and must be deformed into sliding contact with the ball-like member. During this forming process, the inner surface of the race is given its spherical shape.

Heretofore this function has been performed with dies which permanently deform the race into sliding contact with the ball-like member. One problem with this method is that different sizes of dies are required for each different size bearing thereby substantially increasing tooling cost.

Another problem is that due to the inherent tendency of the race to spring back, the dies may have to be used several times to properly form the race. Even though this is done, the inner surface of the race may not conform as closely as desired to the bearing surface of the ball-like member. Finally, the die marks on the race formed by the dies may prove to be objectionable.

SUMMARY OF THE INVENTION

The present invention overcomes the disadvantages noted above by using magnetic means for forming the race over the ball-like member. By passing a pulse of electrical energy through a conductor or forming coil, a variable magnetic field is set up. By appropriately positioning the forming coil and race, the energy from the magnetic field can be used to deform the race against the ball. This not only eliminates the need for different size dies for each different size race but eliminates dies altogether.

The race thus formed is more accurately formed than if dies are used. The energy from the variable magnetic field resulting from a single current pulse through the conductor builds up to a maximum value and then drops off with energy ripples occurring for a short time period thereafter. These ripples of energy tend to prevent springback of the race. The pulse should be of high amplitude to provide the necessary energy and of short duration to minimize heating of the forming coil.

The conductor can be of any configuration which will permit the magnetic field established thereby to properly deform the race into sliding contact with the ball-like member. Preferably, the forming coil extends circumferentially of the race and substantially completely circumscribes the race. For maximum efficiency the forming coil should consist of only a single turn. It is also preferred to have the conductor extend axially of the race for at least the full axial length of the race. For optimum results the length of the forming coil should be approximately equal to the length of the race plus the diameter of the coil.

The passing of current pulses through the forming coil tends to heat the forming coil so that upon continued use of the conductor it may overheat. To prevent this and to permit larger amounts of current to be passed through the forming coil safely, the present invention provides a fluid passage in the forming coil through which a coolant fluid may be supplied. The inner surface of the forming coil is preferably spherical so that it is generally parallel to the outer spherical surface of the formed race. This assures that the force exerted on the race will be more uniform over the full area of the race.

According to the prevent invention, a number of bearings may be rapidly manufactured by supporting a plurality of ball-like members within a tube, providing a varying magnetic field at a first station and advancing the tube with the ball-like members therein through the first station. Each of the ball-like members should remain at the first station for a sufficient time to permit the energy from the magnetic field to permanently deform the adjacent portion of the tube into conformity with the ball-like member and into sliding contact with the ball-like member. Preferably the tube is stepped through the coil. Finally, the tube is cut into sections with one of the ball-like members being in each of the sections to thereby form a plurality of bearings.

The invention can best be understood by reference to the following drawings which should be considered as merely illustrative.

DESCRIPTION OF THE PREFERRED EMBODIMENTS

Figure 2:
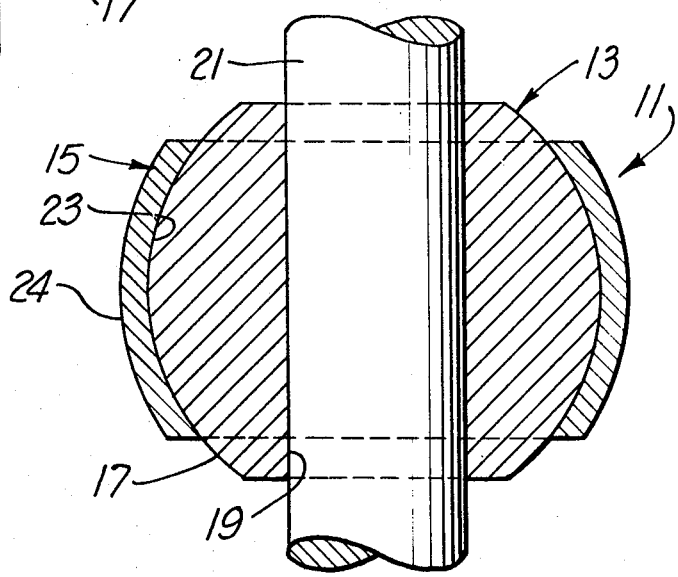
FIG. 2 is a sectional view similar to FIG. 1 after the race has been deformed into sliding contact with the ball to thereby form a bearing.

FIG. 2 illustrates a bearing 11 of the type including a ball-like inner member or ball 13 and a race 15. The ball 13 may be formed of various materials such as metal or ceramic and has a spherical outer bearing surface 17. The ball 13 has a cylindrical diametral passage 19 extending therethrough. A rod 21 extends through the passage 19 and is suitably affixed to the ball 13.

The race 15 in the embodiment illustrated is constructed of metal and has a spherical inner bearing surface 23 which slidingly engages the bearing surface 17 of the ball 13. The bearing surface 23 closely conforms to the earing surface 17 to thereby permit smooth operation of the bearing 11. The race has a spherical outer surface 24.

Figure 1:
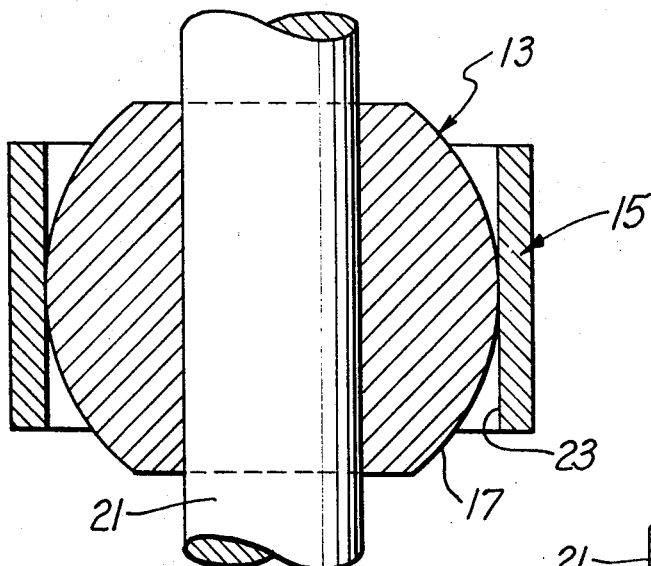
FIG. 1 is a sectional view through a ball and race prior to the time the race is deformed into sliding engagement with the ball.

In making the bearing 11, the ball 13 is first supported on the rod 21 as shown in FIG. 1. The race 15 is initially in the form of a cylindrical sleeve as shown in FIG. 1. The race 15 is slipped over the ball 13 and then the race is deformed radially inwardly to the position shown in FIG. 2. In this manner, the bearing surface 17 is used as a die surface to cause the inner surface 23 of the race 15 to closely conform to the surface 17. Heretofore the race 15 has been deformed with dies. According to the present invention, an apparatus 25 (FIGS. 3–5) is utilized to deform the race 15 radially inwardly.

Figure 4:
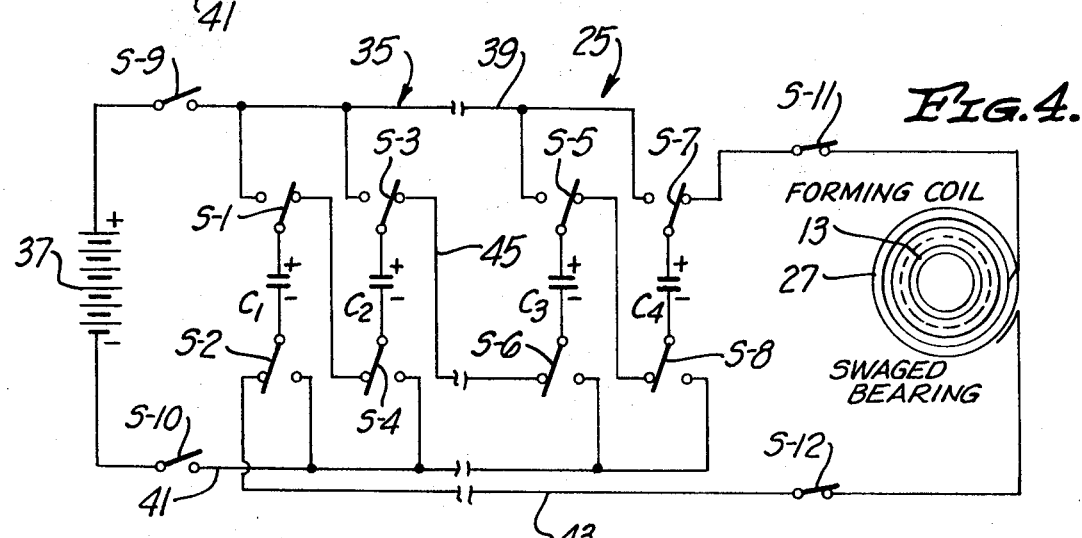
FIG. 4 is a schematic view similar to FIG. 3 with the capacitors interconnected for discharging across the forming coil.
Figure 5:
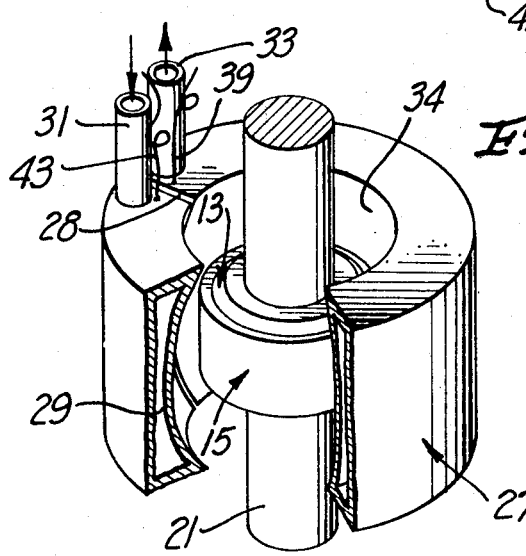
FIG. 5 is a perspective view of a bearing surrounded by a forming coil.

To accomplish the deformation of the race 15, the unit shown in FIG. 1 is positioned within an annular conductor or forming coil 27 (FIG. 5). With the ball 13 and race 15 suitably supported by the rod 21 within the forming coil 27, a pulse of current is passed through the coil from the circuit shown in FIGS. 3 and 4 to thereby create a magnetic field around the coil. The energy from the magnetic field can be made sufficient to deform the race 15 radially inwardly into cooperative engagement with the surface 17 of the ball 13. The use of a magnetic field to perform certain metal forming operations is shown, for example, in U.S. Pat. No. 2,976,907 issued to Harvey, et al.

In the embodiment illustrated, the forming coil 27 comprises a single turn of a conductor terminating in closely spaced end faces defining an insulating gap 28. The coil 27 defines a coolant passage 29 which extends circumferentially around and through the coil 27. A suitable coolant such as water, freon, etc. is supplied to the passage 29 through an inlet 31 and discharged through an outlet 33. The forming coil 27 has an inner surface 34 which is preferably spherical and which is generally parallel to the outer surface 24 of the race 15 (FIG. 2).

To provide a strong, uniform magnetic field completely around the race 15, it is preferred that the coil 27 substantially completely circumscribe the race; however, the coil 27 may be of any shape which will be capable of imparting sufficient energy to adequately deform the race. In the illustrated embodiment, the coil 27 has an axial dimension equal to the full axial length of the race plus the diameter of the coil.

To optimize efficiency, the inner surface 34 of the forming coil 27 should be as close to the outer surface 24 of the race 15 as possible. However, in order to use the same forming coil 27 for races of different diameters, the forming coil 27 must have an inside diameter which is somewhat larger than the outside diameter of some of the races. For economy it is preferred to use a single forming coil for races of different sizes and to suitably vary the amplitude of the electrical pulse supplied to the forming coil to compensate for different spacing between the surfaces 24 and 34.

Figure 3:
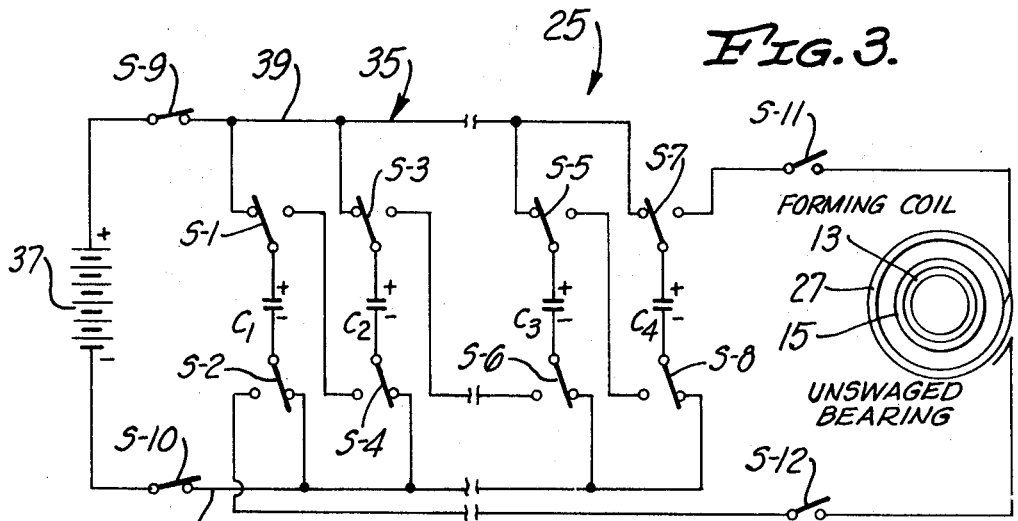
FIG. 3 is a schematic view of an apparatus constructed in accordance with the teachings of the present invention for forming the race over the ball with the capacitors being connected to permit charging thereof by the battery.

The pulse of electrical energy passed through the forming coil 27 must be of large amplitude and short duration. Although various different electrical sources may be utilized to provide such a pulse, in the embodiment illustrated a circuit 35 is utilized. The circuit 35 includes a DC source such as a battery 37 having a plurality of capacitors C1, C2, CN-1 and CN connected in parallel (FIG. 3) across leads 39 and 41 which are connected to the battery. Any suitable number of capacitors may be utilized depending upon the characteristics of the pulse necessary to do the required deforming of the race 15. The parallel hookup of the capacitors shown in FIG. 3 is made possible by single-pole double-throw switches S1-S8. The capacitors can also be connected in series to the forming coil 27 by movement of the switches S1-S8 to the positions shown in FIG. 4. With the switches in the position shown in FIG. 4, the capacitors are connected in series to the forming coil 27 by a portion of the lead 35, a lead 43 and a conductor 45 which, along with the switches S1-S8 interconnects the leads 39 and 43. The leads 39 and 43 are connected to the forming coil 27 on opposite sides of the gap 28 (FIG. 5). A pair of switches S9 and S10 are provided in the leads 39 and 41, respectively, and another pair of switches S11 and S12 are provided in the leads 39 and 43, respectively. In actual practice of the invention, the switches S1-S12 can be ganged.

In operation of the apparatus 25, the rod 21 and the forming coil 27 are suitably supported. The capacitors C1-C4 can be charged by the battery 37 with the switches S1-S8 in the position shown in FIG. 3. Thus, as shown in FIG. 3, the capacitors C1-C4 are connected in parallel across the leads 39 and 41 from the battery 37. The switches S9 and S10 are closed to permit such charging of the capacitors. To positively prevent current flow to the forming coil 27, the switches S11 and S12 are open in the position shown in FIG. 3.

Figure 5A:
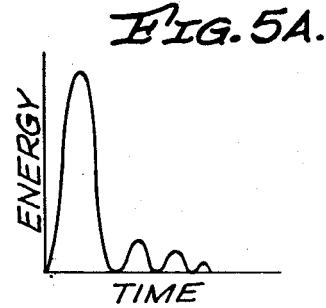
FIG. 5A is a plot of the force applied to the race as a result of passing one pulse of electrical energy through the forming coil.

When the capacitors C1-C4 have been appropriately charged, the switches S1 and S12 can be moved simultaneously to the positions shown in FIG. 4. Opening of the switches S9 and S10 disconnects the battery 37 from the capacitors C1-C4. Movement of the switches S1-S8 to the position shown in FIG. 4, connects the capacitors C1-C4 in series with the forming coil 27. Closing of the switches S11 and S12 allows the series capacitors C1-C4 to discharge a high-amplitude short-duration pulse of electrical energy through the coil 27 to form a magnetic field which deforms the race 15 against the ball 13 in the manner described hereinabove. Energy or force is exerted on the race in the manner shown in FIG. 5A. Thus, there is an initial high-magnitude force which deforms the race into cooperative sliding engagement with the ball followed by several energy ripples of considerably less magnitude. These energy ripples tend to reduce or eliminate springback of the race.

Figure 6:
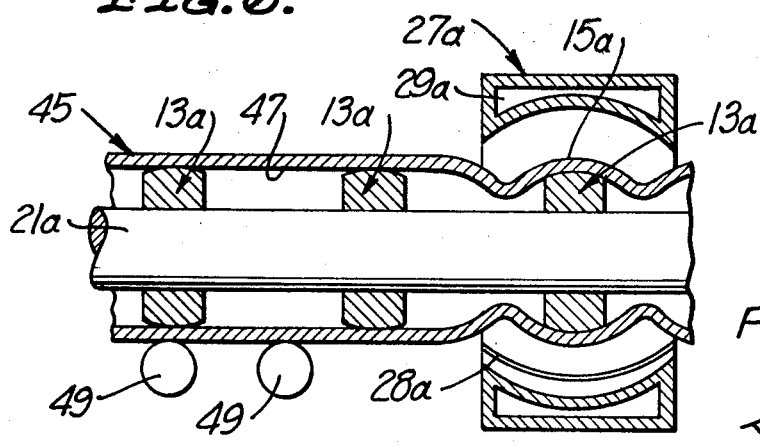
FIG. 6 is a fragmentary sectional view illustrating a modification of the present invention.

FIG. 6 illustrates a method of mass producing bearings which is similar to the method illustrated in FIGS. 1-5. Parts of FIG. 6 corresponding to the embodiment of FIGS. 1-5 are illustrated by corresponding reference characters followed by the letter a.

According to the method illustrated in FIG. 6, a plurality of races 13a, which may be identical to the races 13, are mounted on a rod 21a. Next a tube 45 having a cylindrical passage 47 extending therethrough is mounted on the balls 13a with the balls lying within the passage 47. The tube 45 may be of any desired length and may contain any suitable number of the balls 13a. The tube 45 is supported and advanced in any suitable manner such as by rollers 49.

An annular forming coil 27a, which may be identical to the forming coil 27, is suitably mounted so that the tube 45 with the balls 13a therein can be advanced by the rollers 49 through the forming coil. The tube 45 having the balls 13a therein can be advanced through the forming coil 27a with the tube 45 stopping when the first of the balls 13a lies directly within the forming coil 27a as shown in FIG. 6. With the first ball 13a so positioned, a pulse of high amplitude, short duration, electrical current is supplied from a suitable source such as the circuit 35 (FIGS. 3 and 4) through the forming coil 27a to deform the tube 45 radially inwardly around the ball 13a to thereby form a race 15a.

The tube 45 and the balls 13a should either stop or move sufficiently slowly through the forming coil 27a to permit the energy from the magnetic field produced by the forming coil to deform the adjacent portion of the tube 45 against the ball 13a to form the race 15a. Preferably the motion of the tube 45 is intermittent with the tube stopping when each of the balls 13a is within the forming coil 27a. After the tube has been deformed over each of the races 13a therein, it can be stored and individual bearings can be cut therefrom as necessary. Alternatively, the tube can be cut into individual bearings at a second station immediately following the forming coil 27a.

Although exemplary embodiments of the invention have been shown and described, many changes, modifications, and substitutions may be made by one having ordinary skill in the art without necessarily departing from the spirit and scope of this invention.

I claim:

1. A method of making a bearing comprising:
providing a ball-like inner member having a generally spherical outer bearing surface and a race having an inner surface defining a passage through the race, the inner surface of the race not conforming to the outer bearing surface;
positioning the ball-like inner member in the passage of the race with the inner surface of the race confronting and surrounding the outer bearing surface and with at least portions of the inner surface and the outer bearing surface being spaced;
setting up a varying magnetic field around the race; and
maintaining the magnetic field around the race for a sufficient time to permit the magnetic field to transfer sufficient energy to the race to permanently deform the latter radially inwardly to force said inner surface into slidable contact with the outer bearing surface and with the outer bearing surface acting as a die to conform the inner surface of the race to said outer bearing surface.

2. A method of making a bearing comprising:
providing a ball-like inner member having a generally spherical outer bearing surface and a race having an inner surface defining a passage through the race, the inner surface of the race not conforming to said outer bearing surface;
positioning the ball-like inner member in the passage of the race with the inner surface of the race confronting and surrounding the outer bearing surface and with at least portions of the inner surface and the outer bearing surface being spaced;

providing a forming coil with the forming coil substantially circumscribing the race; and passing at least one pulse of current through the forming coil so that the magnetic field produced thereby will transfer sufficient energy to the race to deform the latter radially inwardly to force said inner surface into slidable contact with the outer bearing surface and with the outer bearing surface acting as a die to conform the inner surface to the outer bearing surface.

3. A method as defined in claim 2 wherein the forming coil defines a fluid passage and including passing a fluid coolant through said fluid passage to cool said forming coil.

4. An apparatus for forming a race on a ball-like inner member wherein the race circumscribes the ball-like inner member comprising:

a forming coil of a shape to provide a magnetic field which will force the race tightly against the ball-like inner member when the conductor is positioned adjacent the race;

means for holding the ball-like inner member and the race adjacent the forming coil;

an electrical current source; and means for passing at least one pulse of current from said source through said forming coil to thereby produce said magnetic field with the energy from the magnetic field deforming the race into slidable contact with the ball-like inner member and accurately conforming the race to the ball-like inner member.

5. An apparatus as defined in claim 4 wherein said forming coil defines a passage for fluid whereby fluid can be supplied through said passage of said conductor to cool the forming coil.

6. An apparatus as defined in claim 4 wherein said forming coil has a generally spherical inner surface.

7. An apparatus as defined in claim 4 wherein said forming coil comprises only a single turn.

8. An apparatus as defined in claim 4 wherein said source includes a plurality of capacitors, means for charging said capacitors, first switch means for connecting said capacitors in parallel to permit charging of the capacitors, said second switch means for connecting the capacitors in series to permit discharging of the capacitors across said forming coil to thereby provide a pulse of current in said conductor.

9. An apparatus as defined in claim 4 wherein the forming coil is generally annular in cross section and the axial length of the forming coil is approximately equal to the axial length of the race plus the inside diameter of the forming coil.

10. An apparatus as defined in claim 4 wherein said forming coil includes a sleevelike member having an axial length at least equal to the axial length of the race, said sleevelike member substantially circumscribing the race and having a pair of closely spaced end portions.

11. A method of making bearings comprising:

supporting a plurality of ball-like members within a deformable tube;

providing a varying magnetic field at a first station; and advancing the tube with the ball-like members therein through said first station with each of said ball-like members remaining at said first station for a sufficient time to permit the energy from the magnetic field to permanently deform the adjacent portion of the tube into conformity with a portion of the surface of the ball-like member and into sliding contact with said portion of the surface of the ball-like member.

12. A method as defined in claim 11 including cutting the tube into sections with at least some of the sections having at least one of the ball-like members therein.

13. A method as defined in claim 11 wherein the step of advancing is carried out intermittently to thereby permit each of the ball-like members to remain at the first station for said sufficient time.